United States Patent
Sagara

(10) Patent No.: US 10,935,737 B2
(45) Date of Patent: Mar. 2, 2021

(54) OPTICAL WAVEGUIDE AND OPTICAL CIRCUIT SUBSTRATE

(71) Applicant: KYOCERA Corporation, Kyoto (JP)

(72) Inventor: Akifumi Sagara, Moriyama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/452,599

(22) Filed: Jun. 26, 2019

(65) Prior Publication Data

US 2020/0033540 A1    Jan. 30, 2020

(30) Foreign Application Priority Data

Jul. 26, 2018 (JP) .............................. JP2018-140316

(51) Int. Cl.
| | |
|---|---|
| *G02B 6/42* | (2006.01) |
| *G02B 6/122* | (2006.01) |
| *G02B 6/12* | (2006.01) |

(52) U.S. Cl.
CPC .......... *G02B 6/4214* (2013.01); *G02B 6/122* (2013.01); *G02B 2006/12121* (2013.01); *G02B 2006/12123* (2013.01)

(58) Field of Classification Search
CPC ................. G02B 6/4214; G02B 6/122; G02B 2006/12121; G02B 2006/12123

USPC .......................................................... 385/14
See application file for complete search history.

(56) References Cited

U.S. PATENT DOCUMENTS

| | | | |
|---|---|---|---|
| 6,069,991 A | 5/2000 | Hibbs-Brenner et al. | |
| 9,470,864 B1 | 10/2016 | Yo | |
| 2004/0202405 A1* | 10/2004 | Ogawa ................. | G02B 6/3502 385/16 |
| 2005/0074207 A1* | 4/2005 | Shioda ................... | G02B 6/122 385/31 |
| 2016/0187582 A1* | 6/2016 | Yanagisawa ......... | G02B 6/4214 264/1.24 |

FOREIGN PATENT DOCUMENTS

| | | |
|---|---|---|
| JP | 2985791 B2 | 12/1999 |
| JP | 2016-012006 A | 1/2016 |

\* cited by examiner

*Primary Examiner* — Jerry M Blevins
(74) *Attorney, Agent, or Firm* — Volpe Koenig

(57) ABSTRACT

An optical waveguide includes a lower clad having an upper flat surface and a lower flat surface, a core positioned on the upper flat surface of the lower clad and includes a linear-shaped configuration and two end portions in the longitudinal direction of the linear-shaped configuration, and an upper clad positioned on the upper flat surface of the lower clad in the state of covering the upper flat surface and the core. Further, the core includes the convex configurations protruding in the planer direction from the linear-shaped configuration. The upper clad includes the opening for exposing the convex configurations in a plan view.

8 Claims, 3 Drawing Sheets

OPTICAL WAVEGUIDE AND OPTICAL CIRCUIT SUBSTRATE

BACKGROUND OF THE INVENTION

1. Technical Field

The present disclosure relates to optical waveguide, and optical circuit substrate including optical waveguide.

2. Background

Along with high functionalization of electronic apparatuses represented by servers and super computers, there have been promoted developments of high-functioning optical waveguide capable of propagating much information at higher speed, and high-functioning optical circuit substrate having the optical waveguide mounted on a wiring substrate (for example, Publication of Japanese Patent No. 2985791). The optical waveguide include a lower clad, a core and an upper clad. Optical devices such as vertical cavity surface-emitting lasers and photodiodes are mounted to the optical waveguide. The optical waveguide are adapted to propagate light signals through the core between an optical device and an external apparatus. When an optical device is mounted thereto, the optical device is mounted on the optical waveguide, with respect to a positioning mark positioned in the upper clad, the lower clad or the wiring substrate as a standard, for example.

BRIEF SUMMARY OF THE INVENTION

An optical waveguide according to the present disclosure includes a lower clad having an upper flat surface and a lower flat surface, a core positioned on the upper flat surface of the lower clad and includes a linear-shaped configuration and two end portions in a longitudinal direction of the linear-shaped configuration, and an upper clad positioned on the upper flat surface of the lower clad in a state of covering the upper flat surface and the core. The core includes a convex configuration protruding in a planer direction from the linear-shaped configuration, and the upper clad includes an opening for exposing the convex configuration in a plan view.

An optical circuit substrate according to the present disclosure includes the optical waveguide having the aforementioned structure, and a wiring substrate, wherein the optical waveguide is positioned on the wiring substrate in a state where the lower flat surface of the lower clad is overlaid on an upper surface of the wiring substrate.

DETAILED DESCRIPTION

Figure 1:
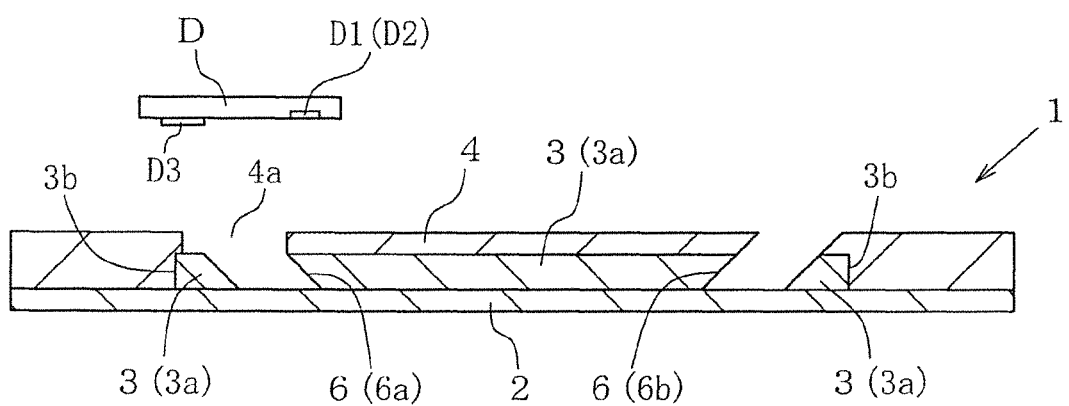
FIG. 1 is a schematic cross-sectional view illustrating an optical waveguide according to one embodiment of the present disclosure.
Figure 2:
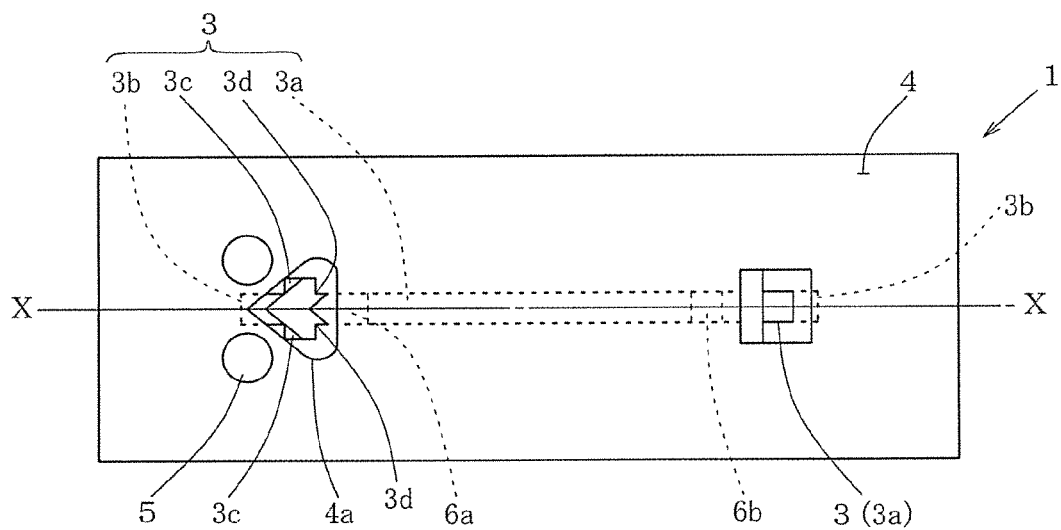
FIG. 2 is a schematic plan view illustrating the optical waveguide according to the one embodiment of the present disclosure.
Figure 3:
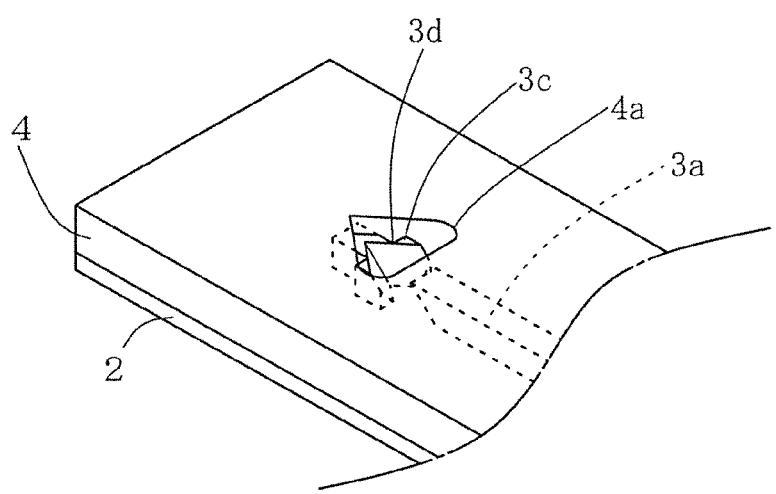
FIG. 3 is a schematic perspective view illustrating main portion of the optical waveguide according to the one embodiment of the present disclosure.

With reference to FIGS. 1 to 3, there will be described an optical waveguide 1 according to an embodiment of the present disclosure. FIG. 1 is a cross-sectional view taken along X-X illustrated in FIG. 2. The optical waveguide 1 includes a lower clad 2, a core 3, an upper clad 4, via holes 5, and reflective surfaces 6.

The lower clad 2 includes an upper flat surface and a lower flat surface. The lower clad 2 is positioned in a state of covering the core 3 together with the upper clad 4 and has the function of inhibiting light signals propagating within the core 3 from emanating to the outside. The lower clad 2 has a thickness set to be 10 to 20 micrometers, for example.

The lower clad 2 is formed as follows. That is, a photosensitive sheet or photosensitive paste which contains an epoxy resin or a polyimide resin is provided on a substrate, for example, through adhesion or coating. Thereafter, the photosensitive sheet or the photosensitive paste is shaped into a predetermined shape through exposure and development and, then is thermally cured.

The core 3 is positioned on the upper flat surface of the lower clad 2. The core 3 has a linear-shaped configuration 3a and, further, has two end portions 3b in the longitudinal direction of the linear-shaped configuration 3a. The linear-shaped configuration 3a has a rectangular-shaped cross section.

The linear-shaped configuration 3a in the core 3 has the function of propagating light signals which are optically sent and received between an optical device D and an external apparatus. The linear-shaped configuration 3a has a thickness and a width which are individually set to be 20 to 40 micrometers, for example.

The core 3 includes convex configurations 3c protruding in a planar direction from the linear-shaped configuration 3a. The convex configurations 3c are positioned at portions proximal to one end portion 3b and are positioned in opposite sides across the linear-shaped configuration 3a. The convex configurations 3c have a thickness and a width which are individually set to be 20 to 40 micrometers, for example.

The convex configurations 3c function as positioning marks, when the optical device D is mounted to the optical waveguide 1, for example. In this case, portions including the intersections of the linear-shaped configuration 3a and the convex configurations 3c (in the present example, four intersection portions 3d at which both intersect orthogonally with each other) are read at the time of positioning.

The core 3 is formed as follows. That is, a photosensitive sheet which contains an epoxy resin or a polyimide resin is provided on the upper flat surface of the lower clad 2 under a vacuum condition, through adhesion or coating, for example. Thereafter, the photosensitive sheet is shaped through exposure and development and, thereafter, is thermally cured.

Regarding the refractive index of the resin which forms the photosensitive sheet for the core 3, a resin having a refractive index larger than the refractive indexes of the resins which form the photosensitive sheets or pastes for the lower clad 2 and the upper clad 4 is employed. This can inhibit light signals from emanating to the outside, which enables propagating them within the core 3.

The upper clad 4 is positioned on the upper flat surface of the lower clad 2, in a state of covering the upper flat surface and the core 3. The upper clad 4 has the function of inhibiting light signals propagating within the core 3 from emanating to the outside, together with the lower clad 2, as described above.

The upper clad 4 includes an opening 4a for exposing the convex configurations 3c in a plan view. In other words, the convex configurations 3c and a portion of the linear-shaped configuration 3a which is connected to the convex configurations 3c are positioned within the opening 4a in a plan view. Namely, the portions including the intersections of the linear-shaped configuration 3a and the convex configurations 3c (in the present example, the four intersection portions 3d at which both intersect orthogonally with each other), which form the aforementioned positioning portions, are positioned within the opening 4a.

The convex configurations 3c and the linear-shaped configuration 3a within the opening 4a are positioned in a state where their respective upper surfaces and their respective side surfaces are exposed. Namely, the convex configurations 3c, the linear-shaped configuration 3a, and the intersection portions 3d between the convex configurations 3c and the linear-shaped configuration 3a are not covered with the upper clad 4, at their respective upper surfaces and their respective side surfaces. Namely, the convex configurations 3c and the linear-shaped configuration 3a are covered with the lower clad 2 only at their lower surfaces.

As described above, the convex configurations 3c, the linear-shaped configuration 3a, and the intersection portions 3d are not covered with the upper clad 4. This is advantageous in improvement of the reading accuracy at the time of positioning, when the optical device D is mounted to the optical waveguide 1.

The opening 4a has a triangular shape having curved portions which correspond to two apexes in a plan view, for example. In other words, the opening 4a has an opening diameter which is partially reduced in the direction toward the end portion 3b of the core 3 which is positioned closer to the opening 4a.

In this case, for example, in cases where the via holes 5, which will be described later, are positioned proximally to the convex configurations 3c, it is possible to provide the opening 4a for exposing the convex configurations 3c in a smaller space. The inner diameter of the opening 4a is set such that the largest width in the direction perpendicular to the longitudinal direction of the linear-shaped configuration 3a is 80 to 100 micrometers and the largest length in the direction parallel to the longitudinal direction thereof is 60 to 80 micrometers, for example.

The convex configurations 3c are positioned in the state of being exposed within the opening 4a. Thus, the convex configurations 3c can be easily recognized as positioning marks, when the optical device D is mounted to the optical waveguide 1, as described above.

The upper clad 4 has a thickness of 10 to 20 micrometers, for example, and has a flat upper surface, above the core 3. In the upper surface of the upper clad 4, it is advantageous that the area which is faced to a light emitting portion D1 or a light receiving portion D2 in the optical device D, which will be described later, has such a surface roughness that the arithmetic mean roughness Ra is equal to or less than 10 nm, in order to reduce diffusion of light signals due to diffused reflection.

In the upper surface of the upper clad 4, it is necessary only that the other area than the area which is faced to the light emitting portion D1 or the light receiving portion D2 in the optical device D has such a surface roughness that the arithmetic mean roughness Ra is 30 nm to 100 nm. For example, in cases where the optical device D and the upper surface of the upper clad 4 are integrally sealed with a resin, it is possible to cause the upper surface of the upper clad 4 to come in contact with the resin over a larger area, thereby increasing the intimate contact strength.

The upper clad 4 is formed as follows. That is, a photosensitive sheet or photosensitive paste which is formed from an epoxy resin or a polyimide resin is provided on the upper flat surface of the lower clad 2 in such a way as to cover the core 3 through adhesion or coating, for example. Thereafter, the opening 4a and the like are formed therein by processing through exposure and development and, then is thermally cured.

The via holes 5 are positioned in a state of being faced to each other, in the direction perpendicular to the longitudinal direction of the linear-shaped configuration 3a in the core 3, in a top view. In the example of FIG. 2, the two via holes 5 are faced to each other in such a way as to sandwich the core 3 between the two via holes 5, and the reflective surfaces 6, which will be described later, are positioned in the core 3. This corresponds to the placement of two electrodes D3 in the optical device D and the light emitting portion D1 or the light receiving portion D2 in the optical device D. Namely, the optical device D is placed such that the respective electrodes D3 are aligned with the respective via holes 5, and the light emitting portion D1 or the light receiving portion D2 is aligned with the reflective surface 6, in a top view.

The distances from the core 3 to the respective via holes 5 are substantially equal to each other. The via holes 5 penetrate through the upper surface and the lower surface of the optical waveguide 1. In other words, the via holes 5 are positioned from the upper surface of the upper clad 4 up to the lower surface of the lower clad 2.

The via holes 5 are formed through laser machining, blast machining or the like, for example. The via holes 5 can be also formed through exposure and development, at the time of forming the lower clad 2 and the upper clad 4. The opening diameters of the via holes 5 are set to be 50 to 80 micrometers, for example. The interval between the opening centers of the via holes 5 faced to each other is set to be 80 to 110 micrometers, for example.

The reflective surfaces 6 are constituted by oblique surfaces which divide the linear-shaped configuration 3a of the core 3. The reflective surfaces 6 include a first reflective surface 6a positioned just beneath the optical device D connected to the optical waveguide 1, and a second reflective surface 6b positioned just beneath a connector C connected to the optical waveguide 1.

The reflective surfaces 6 form an angle of 43 to 46 degrees, for example, with respect to the upper surface of the core 3.

The reflective surfaces 6 have the function of changing the direction of light signals emitted from the optical device D for propagating the light signals to the connector C. Also, the reflective surfaces 6 have the function of changing the direction of light signals emitted from the connector C for causing the optical device D to receive the light signals.

The center axis of the core 3 and the center position of the reflective surfaces 6 are coincident with each other, and light signals are propagated with respect to the center axis and the center position as a standard. In this case, the center axis refers to the position of the intersection of a pair of diagonal lines of the rectangular-shaped cross section of the core 3. The center position refers to the position of the intersection of a pair of diagonal lines of the rectangular-shaped cross section of the reflective surfaces 6.

These reflective surfaces 6 are formed through laser irradiation in an oblique direction from above the upper clad 4, for example. At this time, when the upper clad 4 includes the opening 4a which exposes the convex configurations 3c and a portion of the linear-shaped configuration 3a which is connected to the convex configurations 3c, laser light can be directly directed to the core 3. This makes it easier to perform machining for the reflective surfaces 6.

The shape of irradiation of laser light (namely, the shape of the area which is irradiated with laser light directed perpendicular to the flat surface) can be properly changed, depending on the size, the shape and the like of the portion to be machined. For example, when the opening 4a has a triangular shape as described above, the shape of irradiation can be made to be a triangular shape in conformance to the shape of the opening 4a, which can increase the degree of flexibility of machining.

The reflective surfaces 6 can be also subjected to surface treatments such as plasma treatments, cleaning using a developer. Such surface treatments can increase the reflection accuracy.

As described above, the optical waveguide 1 according to the present disclosure includes the lower clad 2 having the upper flat surface and the lower flat surface, the core 3 positioned on the upper flat surface of the lower clad 2 and includes the linear-shaped configuration 3a and the two end portions 3b in the longitudinal direction of the linear-shaped configuration 3a, and the upper clad 4 positioned on the upper flat surface of the lower clad 2 in the state of covering the upper flat surface and the core 3. Further, the core 3 includes the convex configurations 3c protruding in the planer direction from the linear-shaped configuration 3a, and the upper clad 4 includes the opening 4a which exposes the convex configurations 3c in a plan view.

Thus, when the optical device D is mounted to the optical waveguide 1, for example, the areas including the convex configurations 3c (for example, the four intersection portions 3d at which the linear-shaped configuration 3a and the convex configurations 3c intersect orthogonally with each other) can be utilized as positioning marks, which makes it easier to read (recognize) the positioning marks.

As a result thereof, with the optical waveguide 1, the optical device D can be accurately mounted with respect to the reflective surfaces 6 in the core 3. This enables providing a high-functioning optical waveguide with excellent light-signal propagation properties.

The upper clad 4 includes the opening 4a for exposing a portion of the core 3. This enables directing laser light directly to the core 3. This is also advantageous in improving the workability for the reflective surfaces 6.

Figure 4:
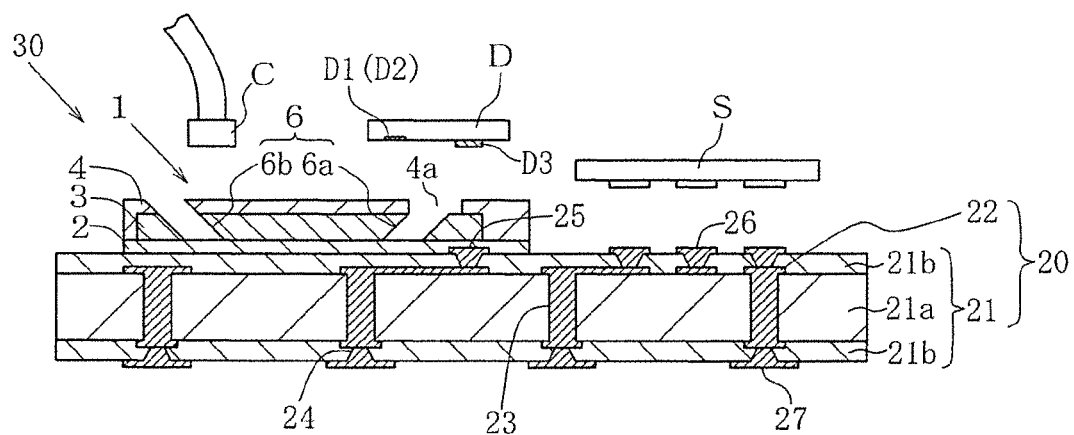
FIG. 4 is a schematic cross-sectional view illustrating an optical circuit substrate according to one embodiment of the present disclosure.

Next, with reference to FIG. 4, there will be described an embodiment of an optical circuit substrate 30 including the optical waveguide 1 according to the present disclosure. Incidentally, the aforementioned optical waveguide 1 will not be described in detail.

The optical circuit substrate 30 includes a wiring substrate 20 and the optical waveguide 1. The wiring substrate 20 has the function of positioning and securing the optical waveguide 1, the optical device D and the connector C and electrically connecting the optical device D to an external portion (a mother board and the like). Through the optical waveguide 1, light signals are propagated between the optical device D and an external apparatus (an optical apparatus or the like). The optical device D, which can be constituted by a vertical cavity surface-emitting laser, a photodiode or the like, is adapted to perform conversion between light signals and electric signals.

The wiring substrate 20 includes an insulation substrate 21 and wiring conductors 22. The insulation substrate 21 includes a core insulating layer 21a and build-up insulating layers 21b. The core insulating layer 21a includes plural through holes 23.

The core insulating layer 21a has the function of ensuring rigidity of the insulation substrate 21 for maintaining its flatness, for example.

The core insulating layer 21a is formed as follows. That is, a half-cured prepreg formed from a glass cloth impregnated with an epoxy resin, a bismaleimide-triazine resin or the like is subjected to pressing to be flattened while being heated, for example.

The build-up insulating layers 21b include plural via holes 24. The build-up insulating layers 21b have the function of securing spaces for routing the wiring conductors 22, which will be described in detail later.

The build-up insulating layers 21b are formed as follows. That is, resin films which contain an epoxy resin, a polyimide resin or the like are adhered to the core insulating layer 21a and are thermally cured, in a vacuum, for example.

The wiring conductors 22 are positioned on the upper and lower surfaces of the core insulating layer 21a and on the upper and lower surfaces of the build-up insulating layers 21b, inside the through holes 23 and inside the via holes 24.

The wiring conductor 22 positioned inside the through holes 23 establishes conduction between the wiring conductors 22 positioned on the upper and lower surfaces of the core insulating layer 21a.

The wiring conductor 22 positioned inside the via holes 24 establishes conduction between the wiring conductors 22 positioned on the surfaces of the build-up insulating layers 21b and the wiring conductors 22 positioned on the surface of the core insulating layer 21a.

The wiring conductors 22 are formed from a metal with high conductivity, such as a plated cupper, through semi-additive method or a subtractive method, for example.

The wiring substrate 20 includes plural first pads 25 on its upper surface. The first pads 25 are connected to the electrodes D3 in the optical device D, through a conductive material within the via holes 5 in the optical waveguide 1. As the conductive material, it is possible to employ a solder, for example. The wiring substrate 20 includes plural second pads 26 on its upper surface and plural third pads 27 on its lower surface. The second pads 26 are connected to an electronic component S such as a semiconductor device or the like, for example. The third pads 27 are connected to a mother board, for example.

The first pads 25, the second pads 26 and the third pads 27 are formed from portions of the wiring conductors 22 and are formed at the same time as the formation of the wiring conductors 22.

The optical waveguide 1 is positioned on the upper surface of the wiring substrate 20 which includes the areas in which the first pads 25 are positioned. The via holes 5 positioned in the optical waveguide 1 have bottom surfaces formed by the first pads 25.

The optical waveguide 1 includes the lower clad 2 having the upper flat surface and the lower flat surface, the core 3 which is positioned on the upper flat surface of the lower clad 2 and includes the linear-shaped configuration 3a and the two end portions 3b in the longitudinal direction of the linear-shaped configuration 3a, and the upper clad 4 positioned on the upper flat surface of the lower clad 2 in the state of covering the upper flat surface and the core 3.

Further, the core 3 includes the convex configurations 3c protruding in the planer direction from the linear-shaped configuration 3a. The upper clad 4 includes the opening 4a for exposing the convex configurations 3c in a plan view.

Thus, when the optical device D is mounted to the optical waveguide 1, for example, the areas including the convex configurations 3c (for example, the four intersection portions 3d at which the linear-shaped configuration 3a and the convex configurations 3c intersect orthogonally with each other) can be utilized as positioning marks, which makes it easier to read (recognize) the positioning marks.

As a result thereof, with the optical waveguide 1, the optical device D can be accurately mounted with respect to the reflective surfaces 6 in the core 3. This enables providing a high-functioning optical waveguide with excellent light-signal propagation properties.

As described above, with the optical circuit substrate 30 according to the present disclosure, the high-functioning optical waveguide 1 is positioned on the upper surface of the wiring substrate 20, which can provide a high-functioning optical circuit substrate.

The present disclosure is not limited to the one example according to the aforementioned embodiment, and various changes and improvements can be made within the scope defined by the claims.

Figure 5:
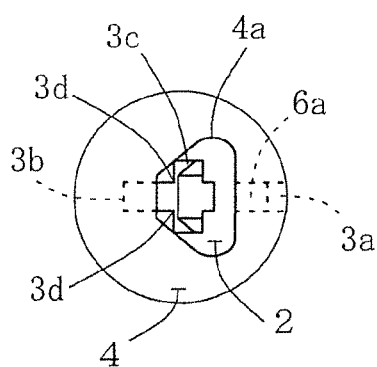
FIG. 5 is a schematic plan view illustrating main portion of an optical waveguide according to another embodiment of the present disclosure.

For example, in the present example, there has been described a case where the opening 4a has a triangular shape. However, as illustrated in FIG. 5, the opening 4a can also have a trapezoidal shape. In this case, the upper bottom (the shorter side) of the trapezoidal shape is positioned closer to the end portion 3b of the core 3. In the case where the opening 4a has a trapezoidal shape, it has no smaller area around an apex unlike a triangular shape, for example. This is advantageous in improving the workability for the opening 4a.

The shape of the opening 4a can be set to be a circular shape, an elongated circular shape, a rectangular shape, an elliptical shape or an arbitrary shape formed by a straight line and a curved line, depending on the conditions of the portion in which the opening 4a should be formed.

In the present example, there has been described a case where the opening 4a is positioned in the upper clad 4 only in the side in which the optical device D is mounted thereon. However, the opening 4a can be also positioned in the upper clad 4 only in the side in which the connector C is connected thereto. This is advantageous in terms of facilitating the formation of the second reflective surface 6b through laser machining.

In the present example, there has been described a case where the single core 3 is positioned in the single optical waveguide 1. However, two or more cores 3 can be also positioned therein. In this case, it is possible to propagate a larger number of light signals, which is advantageous in high functionalization of the optical waveguide 1 and the optical circuit substrate 30.

In the present example, there has been described a case where the core 3 includes the straight-shaped linear-shaped configuration 3a. However, it can also have a curved shape. This case is advantageous in terms of increasing the flexibility of placement of the optical device D.

In the present example, there has been described a case where the wiring substrate 20 includes no solder-resist layer. However, the wiring substrate 20 can also include a solder-resist layer on both or one of the upper surface and the lower surface of the insulation substrate 21. This can inhibit the wiring conductors 22 from being damaged by heat treatments at the time of mounting the electronic component S and the like.

What is claimed is:

1. An optical waveguide comprising:
   a lower clad having an upper flat surface and a lower flat surface;
   a core positioned on the upper flat surface of the lower clad and includes a linear-shaped configuration and two end portions in a longitudinal direction of the linear-shaped configuration; and
   an upper clad positioned on the upper flat surface of the lower clad in a state of covering the upper flat surface and the core;
   wherein the core includes a plurality of convex configurations branching off of the linear-shaped configuration and protruding in a planer direction from the linear-shaped configuration, and the upper clad includes an opening for exposing the plurality of convex configurations in a plan view.

2. The optical waveguide according to claim 1, wherein the core includes an intersection portion at which the linear-shaped configuration and the plurality of convex configurations intersect orthogonally with each other.

3. The optical waveguide according to claim 1, wherein the opening has an opening diameter which is partially reduced in a direction toward each of the end portions of the core which is positioned closer to the opening.

4. The optical waveguide according to claim 1, comprising via holes positioned in a state of being faced to each other, in a direction perpendicular to the longitudinal direction of the linear-shaped configuration, in a top view, the via holes being penetrated from an upper surface of the upper clad up to the lower surface of the lower clad.

5. The optical waveguide according to claim 1, comprising a reflective surface formed by an oblique surface which divides the linear-shaped configuration of the core and forms an angle of 43 to 46 degrees with respect to an upper surface of the core.

6. An optical circuit substrate comprising:
   the optical waveguide according to claim 1; and
   a wiring substrate,
   wherein the optical waveguide is positioned on the wiring substrate in a state where the lower flat surface of the lower clad is overlaid on an upper surface of the wiring substrate.

7. The optical waveguide according to claim 1, wherein the convex configurations are positioned in opposite sides across the linear-shaped configuration.

8. An optical waveguide comprising:
   a lower clad having an upper flat surface and a lower flat surface;
   a core positioned on the upper flat surface of the lower clad and includes a linear-shaped configuration and two end portions in a longitudinal direction of the linear-shaped configuration; and
   an upper clad positioned on the upper flat surface of the lower clad in a state of covering the upper flat surface and the core;
   wherein the core includes positioning marks for mounting an optical device to the optical waveguide, wherein the positioning marks are intersection portions at which the linear-shaped configuration and a plurality of convex configurations branching and protruding in a planer direction from the linear-shaped configuration intersect with each other, and the upper clad includes an opening for exposing the positioning marks in a plan view.

\* \* \* \* \*